(12) United States Patent
Kaneda

(10) Patent No.: US 8,037,300 B2
(45) Date of Patent: Oct. 11, 2011

(54) INFORMATION PROCESSING APPARATUS WITH CERTIFICATE INVALIDITY DETERMINATION

(75) Inventor: Takeshi Kaneda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1087 days.

(21) Appl. No.: 11/146,435

(22) Filed: Jun. 7, 2005

(65) Prior Publication Data

US 2005/0273610 A1 Dec. 8, 2005

(30) Foreign Application Priority Data

Jun. 8, 2004 (JP) .................................. 2004-170229

(51) Int. Cl.
*H04L 29/06* (2006.01)
*H04L 9/32* (2006.01)
(52) U.S. Cl. .................... 713/158; 713/156; 713/157
(58) Field of Classification Search .......... 713/156–158, 713/175; 726/10; 711/121
See application file for complete search history.

(56) References Cited

U.S. PATENT DOCUMENTS

| | | | | |
|---|---|---|---|---|
| 6,122,625 | A * | 9/2000 | Rosen .............................. | 705/65 |
| 6,175,921 | B1 * | 1/2001 | Rosen ........................... | 713/173 |
| 6,675,261 | B2 * | 1/2004 | Shandony ..................... | 711/121 |
| 6,782,379 | B2 * | 8/2004 | Lee ................................... | 707/2 |
| 7,392,380 | B2 * | 6/2008 | Kaji et al. ..................... | 713/158 |
| 7,418,597 | B2 * | 8/2008 | Thornton et al. ............. | 713/175 |
| 2002/0056747 | A1 * | 5/2002 | Matsuyama et al. .......... | 235/382 |
| 2003/0084291 | A1 | 5/2003 | Yamamoto et al. | |
| 2004/0133775 | A1 * | 7/2004 | Callas et al. .................. | 713/153 |

FOREIGN PATENT DOCUMENTS

| | | | |
|---|---|---|---|
| JP | 2001-042769 A | | 2/2001 |
| JP | 2001-111538 A | | 4/2001 |
| JP | 2001-197054 A | | 7/2001 |
| JP | 2001-211306 A | | 8/2001 |
| JP | 2001306788 A | * | 11/2001 |
| JP | 2002-163395 A | | 6/2002 |
| JP | 2002-215826 A | | 8/2002 |
| JP | 2003134109 A | * | 5/2003 |
| JP | 2003-198544 A | | 7/2003 |
| WO | WO 02063847 A2 | * | 8/2002 |
| WO | 03/049358 A1 | | 6/2003 |

OTHER PUBLICATIONS

JP 2003-134109 A (Akiyama Susumu et al.) May 9, 2003(computer-generated translation into English). [online] [retrieved on Dec. 17, 2009]. Retrieved from: Patent Abstracts of Japan Database.*
JP 2001-306788 A (Shimada Masakazu et al.) Nov. 2, 2001 (computer-generated translation into English). [online] [retrieved on Sep. 10, 2010]. Retrieved from: Patent Abstracts of Japan Database.*

* cited by examiner

*Primary Examiner* — Taghi Arani
*Assistant Examiner* — Justin T Darrow
(74) *Attorney, Agent, or Firm* — Canon USA Inc IP Division

(57) ABSTRACT

An information processing apparatus includes a verification unit for verifying validity of a certificate that certifies a communication party and a transmission unit for externally transmitting information for identifying the information processing apparatus and a result of verification of the certificate.

14 Claims, 9 Drawing Sheets

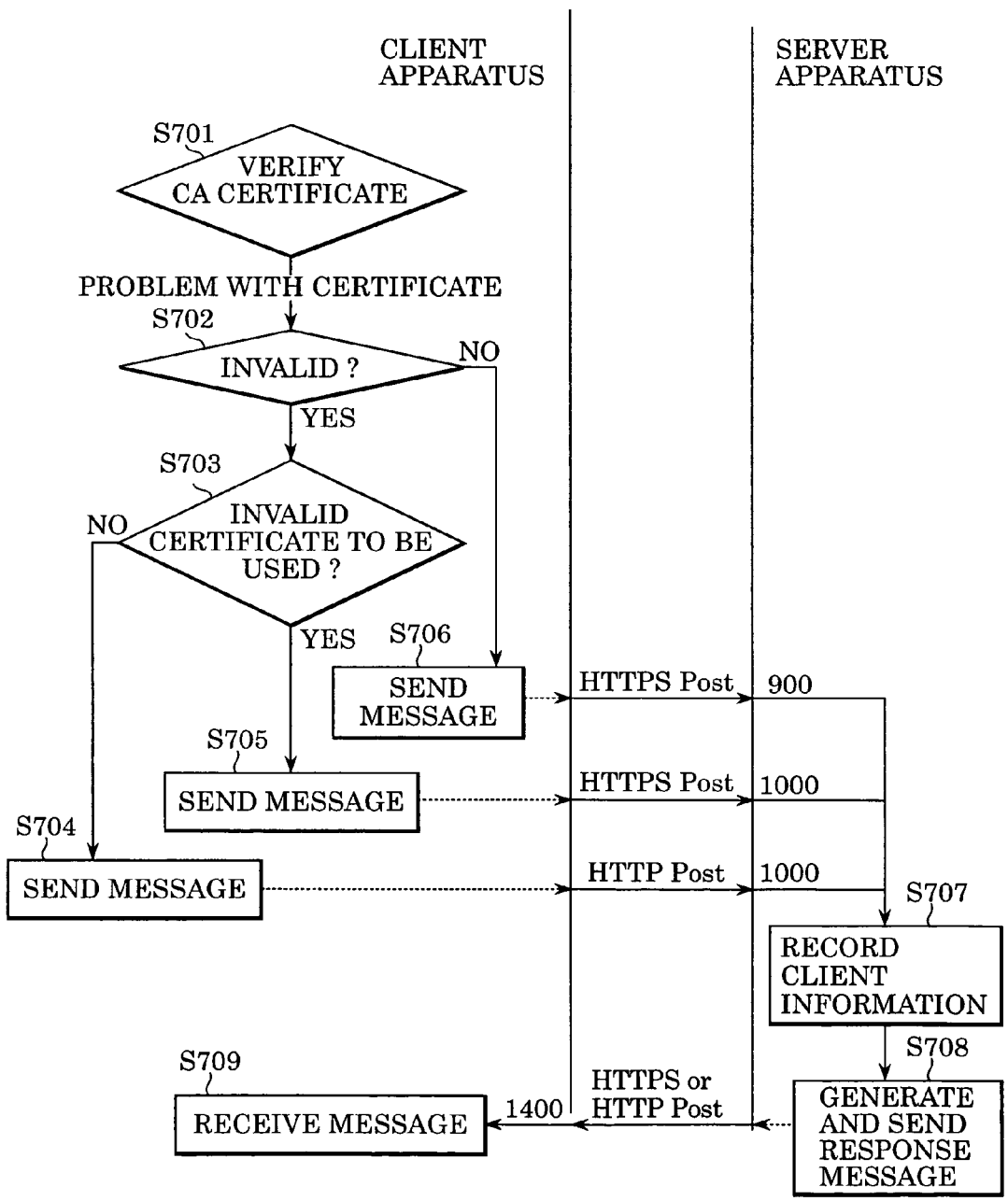

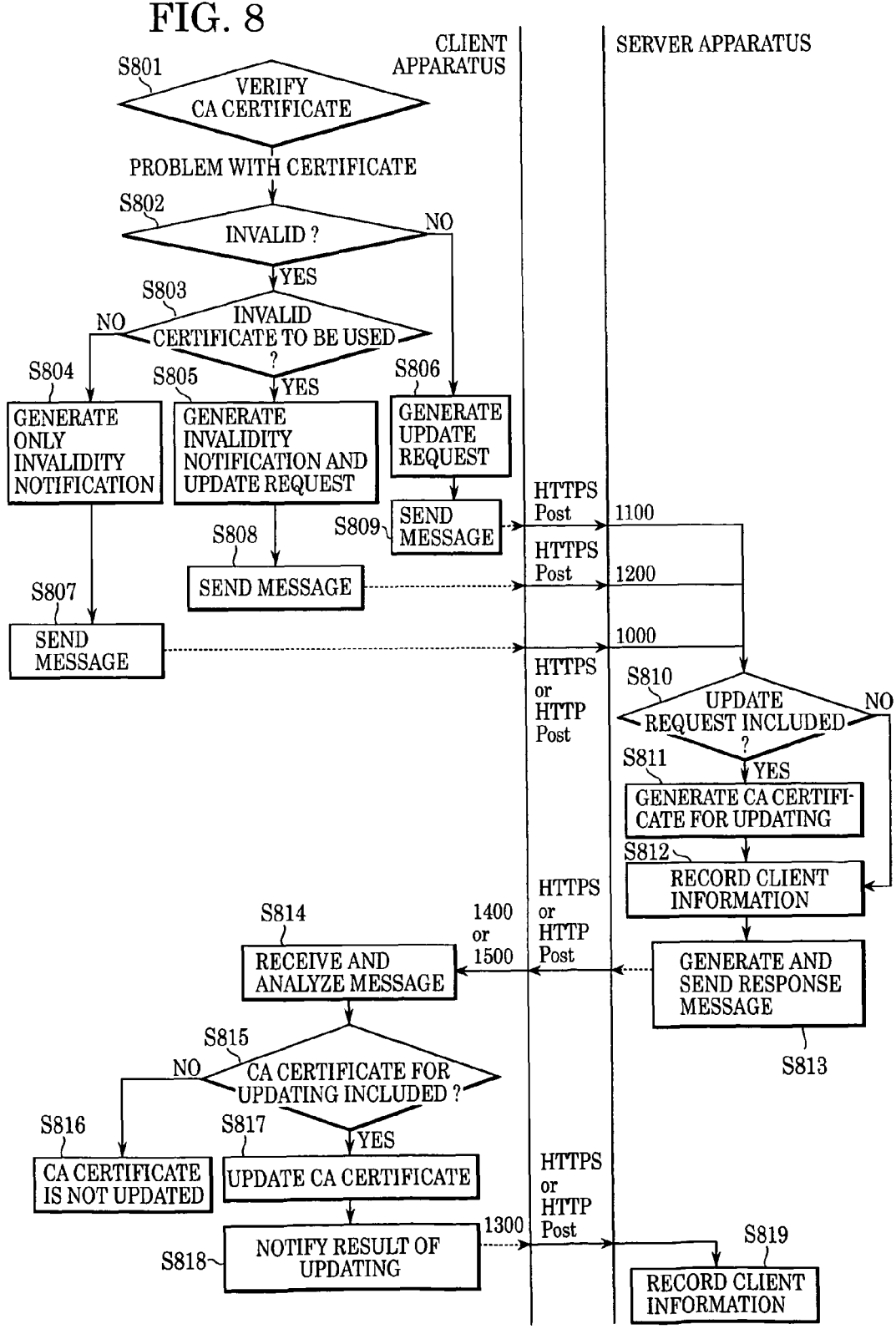

FIG. 9

```
<env:Envelope xmlns:env="http://www.w3.org/2001/12/soap-
envelope" env:encodingStyle="http://www.w3.org/2001/12/soap-
encoding" xmlns:enc="http://www.w3.org/2001/12/soap-encoding">
  <env:Body>
    <cas:client_id xmlns:cas="urn:schemas-ca-status">
     xx:xx:xx:xx
    </cas:cliend_id>
    <cas:ca_status>
     update_term
    </cas:ca_status>
  </env:Body>
</env:Envelope>
```

```
<env:Envelope xmlns:env="http://www.w3.org/2001/12/soap-
envelope" env:encodingStyle="http://www.w3.org/2001/12/soap-
encoding" xmlns:enc="http://www.w3.org/2001/12/soap-encoding">
  <env:Body>
    <cas:client_id xmlns:cas="urn:schemas-ca-status">
     xx:xx:xx:xx
    </cas:cliend_id>
    <cas:ca_status>
     invalid
    </cas:ca_status>
  </env:Body>
</env:Envelope>
```

```
<env:Envelope xmlns:env="http://www.w3.org/2001/12/soap-
envelope" env:encodingStyle="http://www.w3.org/2001/12/soap-
encoding" xmlns:enc="http://www.w3.org/2001/12/soap-encoding">
 <env:Body>
  <cas:ca_status_rpc xmlns:cas=" urn:schemas-ca-status">
    request_ok
  </cas:ca_status_rpc>
  <cas:ca_update_data>
    XXXXXXXXXXXXXXXXXXXXXX....
       .
       .
       .
    XXXXXXXXXXXXXXXXXXXXXX
  </cas:ca_update_data>
 </env:Body>
</env:Envelope>
```

1501

1502

1500

INFORMATION PROCESSING APPARATUS WITH CERTIFICATE INVALIDITY DETERMINATION

BACKGROUND OF THE INVENTION

1. Field of the Invention

The present invention relates to information processing, and in particular to verification of a certificate such as a CA (Certificate Authority) certificate.

2. Description of the Related Art

Japanese Patent Laid-Open No. 2001-211306 describes a technology for distributing confidential images to particular users on a LAN while still maintaining confidentiality by encrypting confidential images received from a public network and saving them in a server computer on the LAN, thereby preventing users other than particular clients from easily accessing the confidential images. If the public key is within the validity period, the received image data is encrypted with the public key, and is transferred by electronic mail having the encrypted confidential image attached. If the public key expires, the received image data is stored in a memory box and an electronic mail describing in the body-text data a message indicating that a confidential image is stored in the memory box is transmitted. Then, transfer of the confidential image is suspended until the public key is updated or the expiration date of the public key is extended.

An information processing apparatus incorporates CA (Certificate Authority) certificates of connected parties, and verifies the identities of the connected parties by the use of the certificates. A server apparatus that provides Web services distributes a CA certificate pre-authenticated by a CA to client apparatuses to prove its identity as a service provider. A client apparatus can confirm that the server apparatus is a service provider certified by a CA only within the validity period of this CA certificate. In order for a client apparatus to use services by a server apparatus continuously, updating or renewal of the CA certificate is required when the CA certificate becomes invalid because of, for example, expiration. In the known client apparatus, if the public key expires, services based on the public key are cancelled and renewal of the public key is awaited. In the same manner, when the CA certificate becomes invalid, measures are required, such as forcible interruption of the use of Web services, manual renewal of the CA certificate by the administrator, or manual renewal of applications, including the CA certificate, by the administrator.

If the administrator of the client apparatus cannot update the CA certificate for some reason, the Web service provider is required to learn the status of the CA certificate in the client apparatus and update the CA certificate in place of the administrator.

SUMMARY OF THE INVENTION

In view of the above-described circumstances, the present invention is directed to automate renewal of certificates such as CA certificates.

According to one aspect of the present invention, an information processing apparatus includes: a verification unit configured to verify validity of a certificate that certifies a communication party; and a transmission unit configured to externally transmit information for identifying the information processing apparatus and a result of verification of the certificate.

According to another aspect of the present invention, an information processing apparatus includes: a verification unit configured to verify validity of a built-in CA certificate; and a transmission unit configured to externally transmit information for identifying the information processing apparatus and a result of verification of the CA certificate.

According to still another aspect of the present invention, an information processing apparatus includes: a reception unit configured to receive information for identifying an external device having a certificate that certifies a communication party and a result of verification of the certificate in the external device; a recording unit configured to record the received result of verification of the certificate; and a transmission unit configured to transmit to the external device a message in response to the received information.

According to still another aspect of the present invention, an information processing apparatus includes: a reception unit configured to receive information for identifying an external device and a result of verification of a CA certificate in the external device; a recording unit configured to record the received result of verification of the CA certificate; and a transmission unit configured to transmit to the external device a message in response to the received information.

According to still another aspect of the present invention, an information processing method includes: verifying validity of a certificate that certifies a communication party; and externally transmitting information for identifying an information processing apparatus and a result of verification of the certificate.

According to still another aspect of the present invention, an information processing method includes: receiving information for identifying an external device having a certificate that certifies a communication party and a result of verification of the certificate in the external device; recording the received result of verification of the certificate; and transmitting to the external device a message in response to the received information.

According to still another aspect of the present invention, a computer-executable program causes a computer to execute the above-described information processing methods.

Further features and advantages of the present invention will become apparent from the following description of exemplary embodiments with reference to the attached drawings.

BRIEF DESCRIPTION OF THE DRAWINGS

FIG. 7 is a flowchart applied when a client apparatus reports a status (invalid or valid though renewal required) of a CA certificate to a server apparatus, according to a first embodiment.

FIG. 8 is a flowchart applied when a client apparatus notifies a server apparatus of a status of a CA certificate and a client apparatus updates the CA certificate according to a security policy, according to a second embodiment.

FIG. 9 is a diagram depicting a SOAP/XML message describing that a client apparatus notifies a server apparatus of a CA certificate that should be updated before it becomes invalid, according to the first embodiment.

FIG. 10 is a diagram depicting a SOAP/XML message describing that a client apparatus notifies a server apparatus that a CA certificate has become invalid and should be updated, according to the first embodiment and the second embodiment.

FIG. 15 is a diagram depicting a SOAP/XML message transmitted from a server apparatus to a client apparatus in response to a request to update a CA certificate, according to the second embodiment.

DESCRIPTION OF THE EMBODIMENTS

Embodiments according to the present invention will now be described in detail with reference to the drawings.

Figure 1:
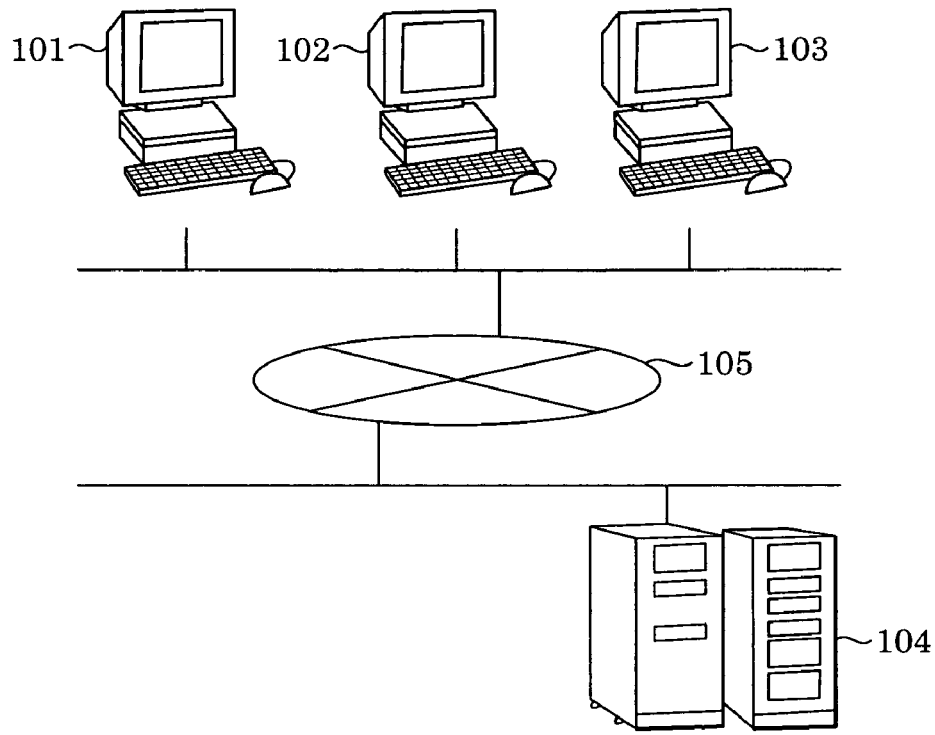
FIG. 1 is a diagram depicting one example of a system structure according to an embodiment of the present invention.

FIG. 1 is a diagram depicting one example of a system structure according to an embodiment of the present invention. Client apparatuses (101 to 103) and a server apparatus (104) are interconnected via a communication network (105). The client apparatuses (101 to 103) use services provided by the server apparatus (104).

Figure 2:
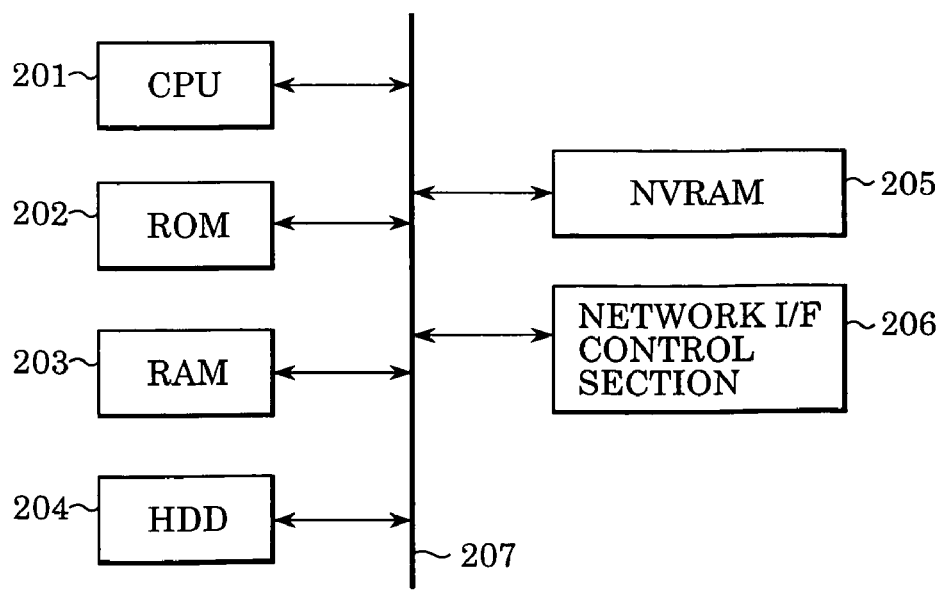
FIG. 2 is a hardware block diagram of a client apparatus according to an embodiment of the present invention.

FIG. 2 is a hardware block diagram of the client apparatus (101) according to an embodiment of the present invention. The client apparatuses (102 and 103) also have the same structure. A CPU (201) executes software programs of the information apparatus (client apparatus) (101) and controls the entire apparatus. A ROM (202) is a read-only memory, and stores the boot program, fixed parameters, etc. of the apparatus. A RAM (203) is a random access memory, and is used to store temporary data, for example, when the CPU (201) controls the apparatus. An HDD (204) is a hard disk drive and is used to store various types of data including software, CA (Certificate Authority) certificates, data generated when Web services are used, and so on. An NVRAM (205) is a non-volatile memory, and saves settings of the information apparatus. A network I/F control section (206) controls transmission/reception of data to/from the communication network (105). A bus (207) is a system bus connected to the CPU (201), the ROM (202), the RAM (203), the HDD (204), the NVRAM (205), and the network I/F control section (206). Control signals from the CPU (201) and data signals between apparatuses are transmitted and received via this bus (207).

Figure 3:
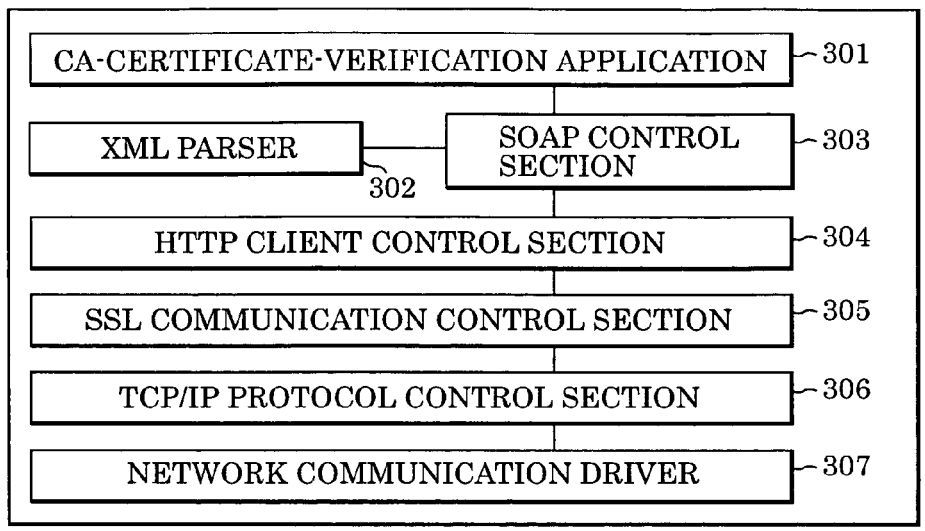
FIG. 3 is a software block diagram of a client apparatus according to an embodiment of the present invention.

FIG. 3 is a software block diagram of the client apparatus (101) according to an embodiment of the present invention. The client apparatuses (102 and 103) also have the same structure.

A CA-certificate-verification application (301) checks for an error from an SSL (Secure Socket Layer) communication control section (305) during communication and regularly verifies the validity of the built-in CA certificate. If a problem with a checksum (609) or a validity period (605, 606) shown in FIG. 6 occurs, the CA-certificate-verification application (301) transmits an invalidity notification (900 or 1000) shown in FIG. 7 and an update request (1100 or 1200) shown in FIG. 8 to the server apparatus (104) via a SOAP (Simple Object Access Protocol) control section (303). If the update request (1100 or 1200) is issued, the CA-certificate-verification application (301) collects a CA certificate for updating sent from the server apparatus (104) and stores it in the HDD (204) of the client apparatus (101). An XML (extensible Markup Language) parser (302) is a module for generating XML-format data and outputting an analysis result of the XML data. SOAP control section (303) analyzes XML format data passed from an HTTP (HyperText Transfer Protocol) client control section (304) by the use of the XML parser (302) and passes it to the CA-certificate-verification updating application (301). It also converts data passed from a CA-certificate-verification service into XML data and returns it to the server apparatus (104) via the HTTP client control section (304). The HTTP client control section (304) analyzes an HTTP packet for appropriate processing, and passes data to a high-level application, such as the SOAP control section (303) and the CA-certificate-verification updating application (301). Furthermore, the HTTP client control section (304) returns an HTTP response packet to the server apparatus (104) according to an instruction of the high-level application.

The SSL communication control section (305) receives a request from the HTTP client control section (304) for connection to the server apparatus (104), and gives an instruction for encrypting the passed SOAP/XML message in the server apparatus (104) and transmitting it to a TCP/IP protocol control section (306). Furthermore, the SSL communication control section (305) decrypts a message received by the TCP/IP protocol control section (306) from the server apparatus (104) and passes it to the HTTP client control section (304).

The TCP/IP protocol control section (306) includes a module for controlling the TCP/IP protocol and performs data transmission and reception control according to the TCP/IP protocol by the use of a network communication driver (307). The network communication driver (307) controls the network I/F control section (206) to control data transmission/reception to/from the network.

Figure 4:
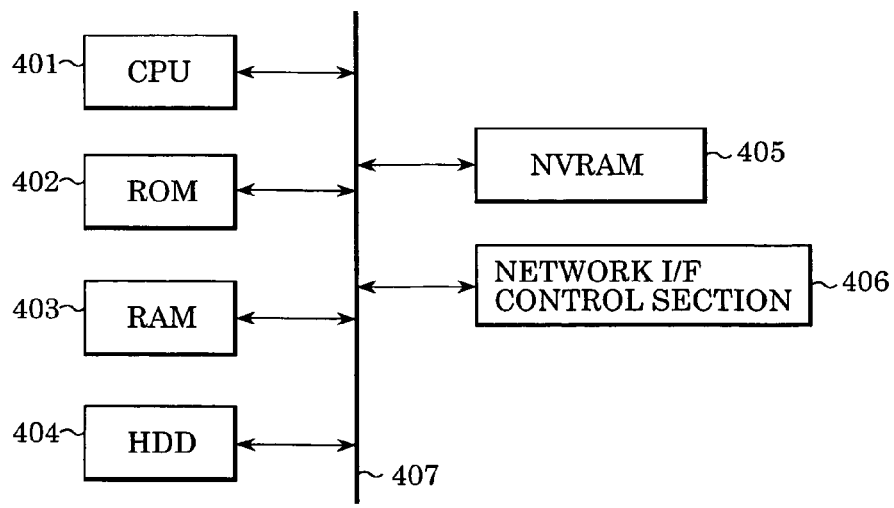
FIG. 4 is a hardware block diagram of a server apparatus according to an embodiment of the present invention.

FIG. 4 is a hardware block diagram of the server apparatus (104) according to an embodiment of the present invention. A CPU (401) executes software programs of the information apparatus (server apparatus) (104) and controls the entire apparatus. A ROM (402) is a read-only memory, and stores the boot program, fixed parameters, etc. of the apparatus. A RAM (403) is a random access memory, and is used to store temporary data, for example, when the CPU (401) controls the apparatus. An HDD (404) is a hard disk drive and is used to store various types of data including the statuses of CA certificates of the client apparatuses (101 to 103), CA certificate for updating, software, data generated when Web services are used, and so on. An NVRAM (405) is a non-volatile memory, and saves settings of the server apparatus. A network I/F control section (406) controls transmission/reception of data to/from the communication network (105). A bus (407) is system bus connected to the CPU (401), the ROM (402), the RAM (403), the HDD (404), the NVRAM (405), and the network I/F control section (406). Control signals from the CPU (401) and data signals between apparatuses are transmitted and received via this bus (407).

Figure 5:
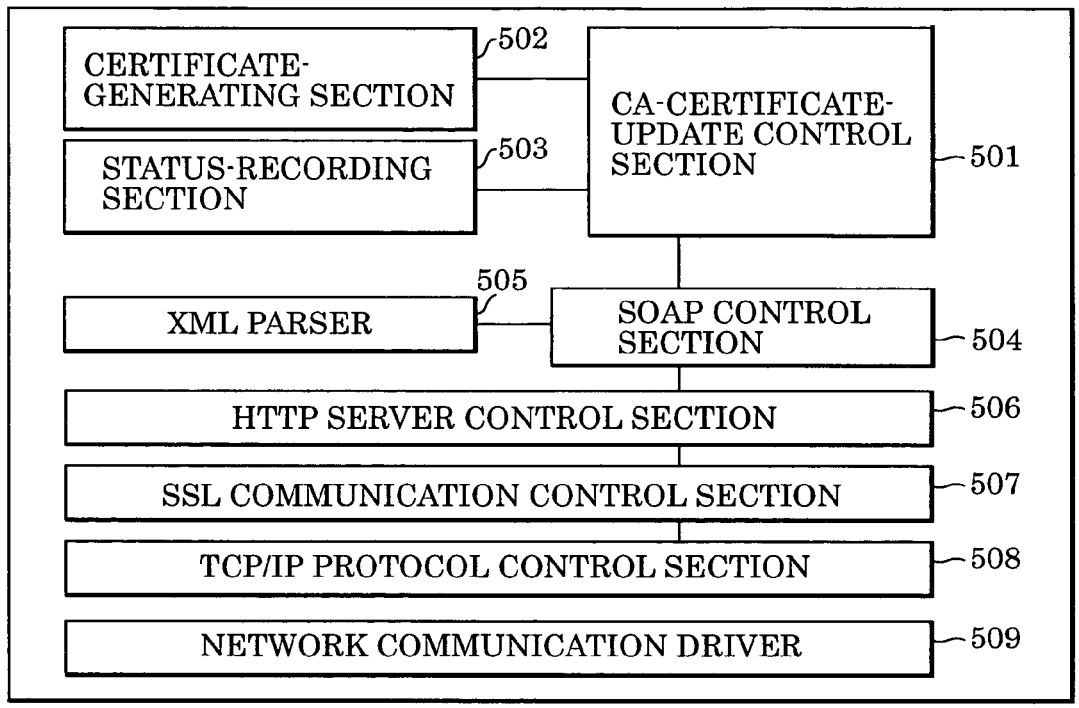
FIG. 5 is a software block diagram of a server apparatus according to an embodiment of the present invention.

FIG. 5 is a software block diagram of the server apparatus (104) according to an embodiment of the present invention. A CA-certificate-update control section (501) includes a certificate-generating section (502) and a status-recording section (503). It carries out processing necessary for CA certificate updating according to a message of the client apparatus (101) passed from a SOAP control section (504). If the message from the client apparatus (101) is CA certificate invalidity notification (900 or 1000), the status-recording section (503) records the status of the CA certificate of the client apparatus (101) and the update control section (501) generates and returns a response message (1200) in FIG. 8 indicating recording completion. If the message from the client apparatus (101) is an update request (1100) or an update request including invalidity notification (1200) in FIG. 8, the status-recording section (503) records the status of the CA certificate of the client apparatus (101), the certificate-generating section (502) generates a CA certificate for updating, and the update control section (501) in FIG. 5 returns a response message (1300) including the CA certificate for updating. The SOAP control section (504) is a module for controlling a protocol called SOAP. It analyzes XML-format data passed from an HTTP server control section (506) by the use of an XML parser (505) and passes it to the CA-certificate-update control section (501). Furthermore, the SOAP control section (504) converts data passed from the CA-certificate-update control section (501) into XML data and passes it to the HTTP server control section (506). The HTTP server control section (506) analyzes an HTTP packet according to the HTTP protocol for appropriate processing, and passes data to the SOAP control section (504). Furthermore, the HTTP server control section (506) returns an HTTP response packet to the client apparatus (101) according to an instruction of the SOAP control section (504). An SSL communication control section (507) receives a connection request from the client apparatus (101) via a TCP/IP protocol control section (508). After receiving a connection request, the SSL communication control section (507) carries out negotiation with the client apparatus (101) over the encryption scheme and starts encrypted communication. After communication has been started, the SSL communication control section (507) carries out decryption processing of data passed from the TCP/IP protocol control section (508) and passes it to the HTTP server control section (506). Furthermore, the SSL communication control section (507) encrypts a SOAP/XML message passed from the HTTP server control section (506) and passes it to the TCP/IP protocol control section (508). The TCP/IP protocol control section (508) includes a module for controlling the TCP/IP protocol and carries out data transmission and reception control according to the TCP/IP protocol by the use of a network communication driver (509). The network communication driver (509) controls the network I/F control section (406) to control data transmission/reception to/from the network.

Figure 6:
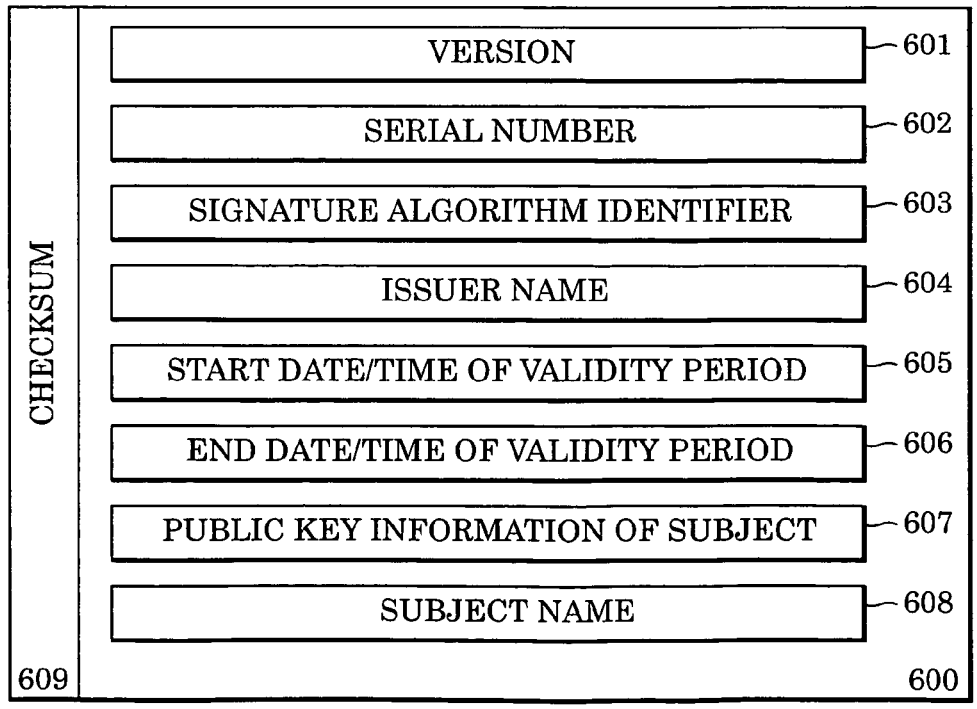
FIG. 6 is a block diagram of a CA certificate to be updated according to an embodiment of the present invention.

FIG. 6 is a block diagram of a CA certificate (600) that is related to the server apparatus (104) and is built in the client apparatus (101), according to a first embodiment and a second embodiment of the present invention. A version (601) identifies the version of the X.509 standard applied to the certificate. Information that can be specified in the certificate differs depending on this value. The CA certificate (600) according to the first and second embodiments store "v3", indicating ver. 3. A serial number (602) stores a number assigned by a CA or the server apparatus (104) (hereinafter, referred to a certificate-generating apparatus) that generates the CA certificate to discriminate from another CA certificate issued by itself. A signature algorithm identifier (603) stores an algorithm used by the certificate-generating apparatus to attach a signature to the certificate. An issuer's name (604) stores an X.500 identification name of the certificate-generating apparatus that has signed the certificate. In general, the identifier is a CA (for the server apparatus (104), the server apparatus (104) itself serves as the root of CAs). Use of this certificate means to trust the entity that has signed the certificate. The validity period of the CA certificate is specified by a start date/time (605) and an end date/time (606). The certificate is valid only within this validity period. The specified period is determined based on the period during which the unidirectionality of the used non-public key is expected not to be compromised, i.e., the period during which the certificate-generating apparatus can trust the public key. A public key (607) stores the public key of the server apparatus (104) whose name is set in a subject name (608) and the algorithm identifier. The algorithm identifier specifies a public key encryption system used for the public key and associated key parameters. The subject name (608) stores the name of the server apparatus (104) whose public key is identified by the certificate (600). This name is in compliance with the X.500 standard, and is unique on the Internet.

FIG. 7 is a flowchart applied when the client apparatus (101) reports a status (invalid or valid though updating required) of the CA certificate to the server apparatus (104), according to the first embodiment.

FIG. 8 is a flowchart applied when the client apparatus (101) notifies the server apparatus (104) of the status of the CA certificate and the client apparatus (101) updates the CA certificate according to a security policy, according to the second embodiment.

FIG. 9 is a diagram depicting a SOAP/XML message (900) describing that the client apparatus (101) notifies the server apparatus (104) of a CA certificate that should be updated, according to the first embodiment. This message includes information (901) used by the server apparatus (104) to identify the client apparatus (101) and information (902) indicating that the CA certificate of the client is within the updating period.

FIG. 10 is a diagram depicting a SOAP/XML message (1000) describing that the client apparatus (101) notifies the server apparatus (104) that the CA certificate has become invalid and should be updated, according to the first embodiment and the second embodiment. This message includes information (1001) used by the server apparatus (104) to identify the client apparatus and information (1002) indicating that the CA certificate of the client apparatus (101) has expired.

Figure 11:
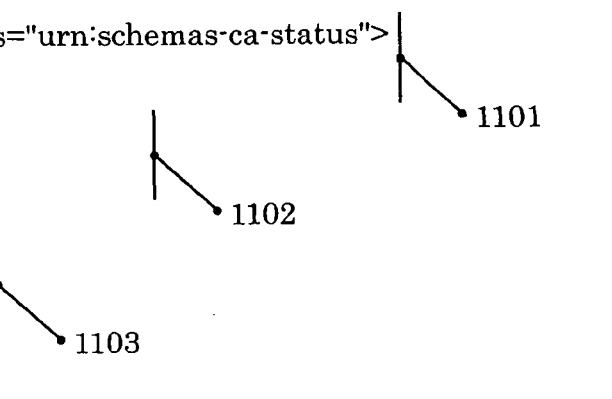
FIG. 11 is a diagram depicting a SOAP/XML message describing that a client apparatus requests a server apparatus to update a CA certificate before it becomes invalid, according to the second embodiment.

FIG. 11 is a diagram depicting a SOAP/XML message (1100) describing that the client apparatus (101) makes a request to the server apparatus (104) for a CA certificate for updating before the CA certificate becomes invalid, according to the second embodiment. This message includes information (1101) used by the server apparatus (104) to identify the client apparatus (101), information (1102) indicating that the CA certificate of the client apparatus (101) is in the updating period, and a request (1103) to transmit a CA certificate for updating.

Figure 12:
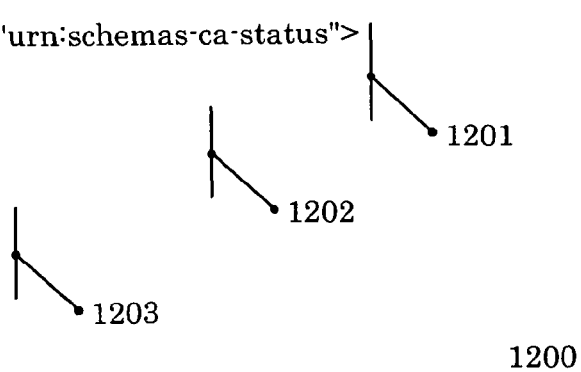
FIG. 12 is a diagram depicting a SOAP/XML message describing that a client apparatus request a server apparatus to update a CA certificate after it becomes invalid, according to the second embodiment.

FIG. 12 is a SOAP/XML message (1200) describing that the client apparatus (101) makes a request to the server apparatus (104) for a CA certificate for updating after the CA certificate has expired, according to the second embodiment. This message includes information (1201) used by the server apparatus (104) to identify the client apparatus (101), information (1202) indicating that the certificate of the client apparatus (101) is invalid, and a request (1203) to transmit a CA certificate for updating.

Figure 13:
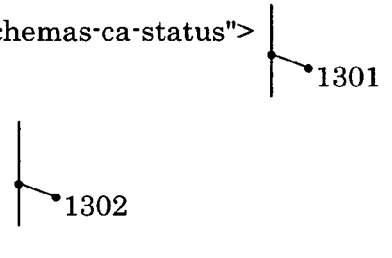
FIG. 13 is a diagram depicting a SOAP/XML message describing that a client apparatus notifies a server apparatus of the result of renewal of a CA certificate, according to the second embodiment.

FIG. 13 is a diagram depicting a SOAP/XML message (1300) sent by the client apparatus (101) to notify the server apparatus (104) of the result of updating of the CA certificate, according to the second embodiment. This message includes information (1301) used by the server apparatus (104) to identify the client apparatus (101) and a result of updating (1302) on the client apparatus (101).

Figure 14:
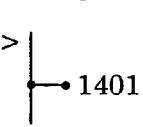
FIG. 14 is a diagram depicting a SOAP/XML message transmitted from a server apparatus to a client apparatus in response to CA-certificate-invalidity notification, according to the first embodiment and the second embodiment.

FIG. 14 is a diagram depicting a SOAP/XML message (1400) transmitted from the server apparatus (104) to the client apparatus (101) in response to CA-certificate-invalidity notification (1000), according to the first embodiment and the second embodiment. This message includes information (1401) indicating the acquisition of an invalidity notification.

FIG. 15 is a diagram depicting a SOAP/XML message (1500) transmitted from the server apparatus (104) to the client apparatus (101) in response to a request to update the CA certificate (1100 or 1200), according to the second embodiment. This message includes status information (1501) at the time of acquisition of an update request and CA certificate for updating (1502).

First Embodiment

The first embodiment according to the present invention will now be described by way of example of communication between the server apparatus (104) and the client apparatus (101).

FIG. 7 is a flowchart applied when the client apparatus reports a status (invalid or valid though updating required) of the CA certificate to the server apparatus, according to the first embodiment. Steps S701 to S706 and step S709 are processing carried out by the client apparatus, whereas steps S707 and S708 are processing carried out by the server apparatus.

In step S701, it is determined whether the CA certificate built into the client apparatus is valid. This verification is carried out periodically in some cases, or in other cases, a result of verification is obtained with event notification (occurrence) from the SSL communication control section (305). If it is determined in step S701 that the CA certificate is problematic, the problem is verified in step S702. If it is expected that the certificate will expire in near future (though the certificate is valid at the time of verification), the flow proceeds to step S706, where a message (900) indicating updating is required is encrypted and transmitted to the server apparatus. If the certificate is invalid, the flow proceeds to step S703. In step S703, the handling of the invalid CA certificate is determined according to the security policy set by the administrator of the client apparatus. If the invalid CA certificate is to be used, the flow proceeds to step S705. If the invalid CA certificate is not to be used, the flow proceeds to step S704. In step S705, communication encrypted based on SSL is carried out to transmit CA certificate invalidity notification (1000) to the server apparatus. In step S704, if it is all right that the CA-certificate-invalidity notification is accessible to third parties on the communication pathway, the notification (1000) is sent without encryption.

The notification (900 or 1000) transmitted from the client apparatus reaches the server apparatus via the communication network (105).

In step S707, the server apparatus receives the notification sent from the client apparatus and records information (901 or 1001) for identifying the client apparatus and the status (902 or 1002) of the CA certificate in the HDD (404) of the server apparatus. Then, the flow proceeds to step S708. In step S708, the server apparatus sends reception-completion notification (1400) to the client apparatus. In step S709, the reception-completion notification is received by the client apparatus via the communication network 105.

A certificate, such as a CA certificate, can be automatically updated by verifying the certificate and then carrying out processing according to the result of verification.

Second Embodiment

The second embodiment according to the present invention will now be described by way of example of communication between the server apparatus (104) and the client apparatus (101).

FIG. 8 is a flowchart applied when the client apparatus notifies the server apparatus of a status of the CA certificate and the client apparatus updates the CA certificate according to a security policy, according to the second embodiment. Steps S801 to S809 and steps S814 to S818 are carried out by the client apparatus, whereas steps S810 to S813 and step S819 are carried out by the server apparatus.

In step S801, it is determined whether the CA certificate built into the client apparatus is valid. This verification is carried out periodically in some cases, or in other cases, a result of verification is obtained with event notification (occurrence) from the SSL communication control section (305). If it is determined in step S801 that the CA certificate is problematic, the problem is verified in step S802. If it is expected that the certificate will expire in near future (though the certificate is valid at the time of verification), the flow proceeds to step S806, where an update request message (1100) is generated and in step S809 transmitted to the server apparatus. If the certificate is invalid, the flow proceeds to step S803. In step S803, the handling of the invalid CA certificate is determined according to the security policy set by the administrator of the client apparatus. If the invalid CA certificate is to be used, the flow proceeds to step S805. If the invalid CA certificate is not to be used, the flow proceeds to step S804. In step S805, CA certificate invalidity notification and an update request (1200) are generated and in step S808 transmitted to the server apparatus using SSL. In step S804, only if it is all right that the CA-certificate-invalidity notification is accessible to third parties, the invalidity notification (1000) is sent without encryption in step S807.

The notification (1000, 1100, and 1200) transmitted from the client apparatus reaches the server apparatus via the communication network (105).

In step S810, the server apparatus analyzes the received message. If a request to update the CA certificate is included, the flow proceeds to step S811. If no request to update the CA certificate is included, the flow proceeds to S812. In step S811, a CA certificate for updating is generated and the flow proceeds to step S812. In step S812, information for identifying the client apparatus and the status (verification result) of the CA certificate are recorded and then the flow proceeds to step S813. In step S813, one of two response messages (1400, 1500) are generated and transmitted to the client apparatus depending on whether a CA certificate for updating is included or not.

The notification (1400 or 1500) transmitted from the server apparatus reaches the client apparatus via the communication network (105).

The client apparatus receives and analysis the notification (1400 or 1500) in step S814. It is verified in step S815 whether a CA certificate for updating is included. If a CA certificate is included, in step S817 the CA-certificate-verification updating application (301) carries out CA certificate update processing, and then the flow proceeds to step S818. If no CA certificate for updating is included in step S815, the flow proceeds to step S816, where a determination is made that notification of the server apparatus is successful, and the processing ends. In step S818, a message (1300) reporting the result of processing in step S817 is generated and is then transmitted to the server apparatus.

The notification (1300) transmitted from the client apparatus reaches the server apparatus via the communication network (105). In step S819, the server apparatus records the processing result of the client apparatus and ends the update processing.

As described above, according to the first and second embodiments, a CA certificate can be automatically updated and prevented from expiring by verifying the certificate and then carrying out processing according to the result of verification.

The first and second embodiments can also be realized by a computer executing a program. Furthermore, means for supplying computers with the program, for example, a computer-readable recording medium, such as a CD-ROM, on which the program is recorded and a transmission medium, such as the Internet, for transmitting the program are also applied as embodiments according to the present invention. In addition, a computer program product, such as a computer-readable recording medium, on which the above-described program is recorded is also applied as an embodiment according to the present invention. The above-described program, recording medium, transmission medium, and computer program product are included in the present invention. The recording medium includes a floppy disk, a hard disk, an optical disk, a magneto-optical disk, a CD-ROM, a magnetic tape, a non-volatile memory card, and a ROM.

The above-described embodiments are just example of the present invention. Therefore, the present invention should not be limited to the above-described embodiments. In other words, various modifications of the present invention are conceivable within the spirit and scope of the present invention.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-170229 filed Jun. 8, 2004, which is hereby incorporated by reference herein.

What is claimed is:

1. An information processing apparatus comprising:
a storage unit configured to store a certificate for certifying a communication destination;
an invalidity-determination unit configured to determine whether the certificate is invalid; and
a transmission unit configured to encrypt a request for a certificate for certificating the communication destination and transmit, to an external server the encrypted request if the invalidity-determination unit determines that the certificate is invalid and it is necessary to update the certificate, and to transmit, to the external server, information indicating that the certificate is invalid without encrypting the information and without transmitting the request, if the invalidity-determination unit determines that the certificate is invalid and it is not necessary to update the certificate.

2. An information processing apparatus according to claim 1, wherein the invalidity-determination unit determines whether the certificate is invalid at predetermined intervals or at the time of an event occurrence.

3. An information processing apparatus according to claim 1, wherein the external server stores information indicating the validity of the certificate for each of a plurality of the information processing apparatuses.

4. An information processing apparatus according to claim 1, further comprising:
a reception unit configured to receive a certificate for updating; and
an update unit configured to update the certificate stored in said storage unit using the received certificate for updating.

5. An information processing method comprising:
storing, in a storage unit, a certificate for certifying a communication destination;
determining whether the certificate is invalid;
encrypting a request for a certificate for certifying the communication destination;
transmitting, to an external server, the encrypted request if it is determined that the certificate is invalid and it is necessary to update the certificate; and
transmitting, to the external server, information indicating that the certificate is invalid without encrypting the information and without transmitting the request, if it is determined that the certificate is invalid and it is not necessary to update the certificate.

6. An information processing method according to claim 5, wherein it is determined whether the certificate is invalid at a predetermined interval or at the time of an event occurrence.

7. An information processing method according to claim 5, wherein the external server stores information indicating the validity of the certificate for each of a plurality of the information processing apparatuses.

8. An information processing method according to claim 5, further comprising:
receiving a certificate for updating; and
updating the certificate stored in the storage unit using the received certificate for updating.

9. An information processing apparatus according to claim 1, wherein the communication destination is the external server.

10. An information processing apparatus according to claim 1, wherein the invalidity-determination unit determines whether the certificate is invalid based on an expiration time of the certificate.

11. An information processing apparatus comprising:
a storage unit configured to store a CA (Certificate Authority) certificate;
an invalidity-determination unit configured to determine whether the CA certificate is invalid; and
a transmission unit configured to encrypt a request for a CA certificate and transmit, to an external server, the encrypted request if the invalidity-determination unit determines that the CA certificate is invalid and it is necessary to update the CA certificate, and to transmit, to the external server, information indicating that the CA certificate is invalid without encrypting the information and without transmitting the request, if the invalidity-determination unit determines that the CA certificate is invalid and it is not necessary to update the CA certificate.

12. An information processing apparatus comprising:
a storage unit configured to store a certificate for certifying a communication destination;

an invalidity-determination unit configured to determine whether the certificate is invalid; and a transmission unit configured to encrypt information indicating that the certificate is invalid and transmit, to an external server, the encrypted information if the invalidity-determination unit determines that the certificate is invalid and it is necessary to update the certificate, and transmits to the external server information indicating invalidity of the certificate if said invalidity-determination unit determines that the certificate is invalid and it is not necessary to update the certificate, the information indicating invalidity of the certificate being not encrypted.

13. An information processing apparatus according to claim 12, wherein the transmission unit encrypts the information indicating that the certificate is invalid and information for specifying the information processing apparatus and transmits, to the external server, the encrypted information indicating that the certificate is invalid and the encrypted information for specifying the information processing apparatus.

14. An information processing apparatus comprising:

a storage unit configured to store a CA (Certificate Authority) certificate;

an invalidity-determination unit configured to determine whether the CA certificate is invalid; and a transmission unit configured to encrypt information indicating that the CA certificate is invalid and transmit, to an external server, the encrypted information if the invalidity-determination unit determines that the CA certificate is invalid and it is necessary to update the CA certificate, and to transmit, to the external server, information indicating that the CA certificate is invalid without encrypting the information without transmitting the request, if the invalidity-determination unit determines that the CA certificate is invalid and it is not necessary to update the CA certificate.

* * * * *